United States Patent [19]

Yamamiya et al.

[11] Patent Number: 4,499,514
[45] Date of Patent: Feb. 12, 1985

[54] DISC DRIVE APPARATUS

[75] Inventors: Kunio Yamamiya; Hiroshi Kodama; Ken Ohshima; Shoji Yoshikawa; Kiichi Kato; Masaharu Sakamoto, all of Tokyo, Japan

[73] Assignee: Olympus Optical Co., Ltd., Tokyo, Japan

[21] Appl. No.: 362,614

[22] Filed: Mar. 29, 1982

[30] Foreign Application Priority Data

Mar. 31, 1981 [JP] Japan .................................. 56-48007
Mar. 31, 1981 [JP] Japan ............................ 56-46397[U]
Mar. 31, 1981 [JP] Japan ............................ 56-46398[U]

[51] Int. Cl.$^3$ .................................................. G11B 5/012
[52] U.S. Cl. ..................................... 360/97; 360/137; 369/271
[58] Field of Search .................................. 360/97–99, 360/137; 369/270, 271

[56] References Cited

U.S. PATENT DOCUMENTS 4,054,291 10/1977 Maeda ................ 274/39 R
4,065,135 12/1977 Doughty ............ 274/39 R
4,234,195 11/1980 Shibata ............... 274/39 R

FOREIGN PATENT DOCUMENTS 54-126002 9/1979 Japan .................................. 369/271
2079030 1/1982 United Kingdom ............... 369/271

Primary Examiner—John H. Wolff
Attorney, Agent, or Firm—Frishauf, Holtz, Goodman & Woodward

[57] ABSTRACT

A disc drive apparatus for driving a disc selected from discs of various diameters with and without a central hole comprises: a turntable with a hole at the center of rotation thereof; a turntable support for rotatably supporting the turntable; a motor for driving the turntable; a centering member to be detachably inserted in the hole of the turntable and for mounting a disc with a central hole; a plurality of elastic disc support members which are coaxial with the center of rotation of the turntable, which extend from the surface of the turntable, and which form a plurality of annular shapes; centering index marks, disposed on the turntable, for centering a disc without a central hole; a vacuum pump; and suction channels, one end of which is open to the surface of the turntable and the other end of which is connected to the vacuum pump, for fixing on some of the disc support members the disc selected from discs of various diameters with and without a central hole and placed on some of said disc support members.

13 Claims, 8 Drawing Figures

DISC DRIVE APPARATUS

BACKGROUND OF THE INVENTION

The present invention relates to a disc drive apparatus for driving various discs such as a magnetic disc, a video disc, and an original disc for the video disc, using a turntable.

A conventional disc drive apparatus may be used in an inspection unit for inspecting surface defects such as scratches, flaws and cracks in the original disc of an optical video system. The disc drive apparatus of this type has a turntable, a turntable support for rotatably supporting the turntable, and driving means such as a motor for driving the turntable.

A shaft which is fitted in a central hole of a disc extends at the rotational center of the turntable. Female threads are formed on the rotational center of the shaft. A pressing member has male threads and a pressing pad on the lower surface thereof. These male threads engage with the female threads.

The disc with a central hole is coaxial with the turntable since the shaft on the turntable is fitted into the hole. Further, the female threads of the shaft of the turntable engage with the male threads of the pressing member. Therefore, the disc with a central hole is clamped between the pressing pad of the pressing member and the upper surface of the turntable.

In the conventional disc drive apparatus of this type, discs with different sized central holes and a disc without a central hole cannot be used. Since the disc is firmly clamped between the pressing pad of the pressing member and the upper surface of the turntable, scratches tend to be formed on the surface of the disc.

SUMMARY OF THE INVENTION

The present invention has been made in consideration of the above and has for its object to provide a disc drive apparatus which is capable of mounting with centering various discs easily and properly regardless of the size of the discs or the presence or absence of a central hole, and which prevents damage of the disc surface.

DETAILED DESCRIPTION OF THE PREFERRED EMBODIMENTS

A disc drive apparatus according to one embodiment of the present invention will be described with reference to the accompanying drawings.

Figure 1:
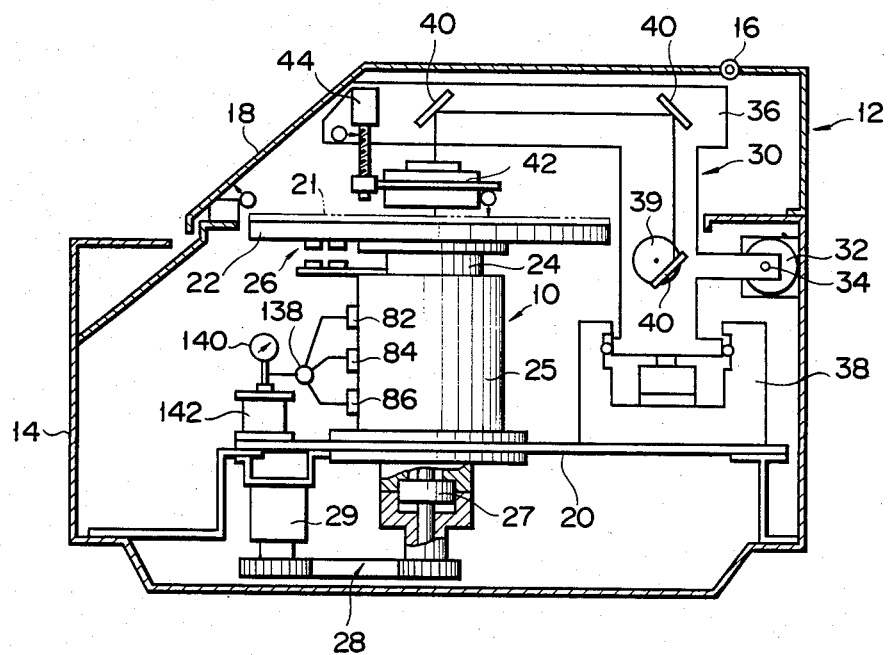
FIG. 1 is a longitudinal sectional view schematically showing a disc surface defect inspection apparatus which has a disc drive apparatus of one embodiment of the present invention.

FIG. 1 is a schematic longitudinal sectional view of a disc surface defect inspection apparatus 12 which has a disc drive unit 10 of one embodiment of the present invention.

The disc surface defect inspection apparatus 12 has a housing 14 which houses a disc drive apparatus 10. The housing 14 has a cover 18 rotatable about a hinge 16 between an opening position and a closing position as shown in FIG. 1.

The disc drive apparatus 10 is mounted on a base 20 inside the housing 14. The disc drive apparatus 10 has a turntable main body 22 which has a turntable surface on which various discs 21 of various diameters with or without a central hole are placed, a turntable shaft 24 disposed at the center of rotation of the turntable main body 22, and a turntable support 25 which rotatably supports the turntable shaft 24. The turntable main body 22 and the turntable shaft 24 constitute a turntable 26. The turntable shaft 24 is coupled to driving means 27 by known coupling means in order to rotate the turntable main body 22. In this embodiment, the driving means 27 comprises a motor. The driving means 27 is connected to a brake mechanism 29 by known transmitting means 28 such as pulleys and a belt.

An inspection unit 30 is provided for sensing surface defects of the various discs 21 each of which is placed on the turntable main body 22 inside the housing 14. The inspection unit 30 has a motor 32, a lead screw 34 driven by the motor 32, a carriage 36 reciprocally movable in a direction perpendicular to the plane of the drawing by means of the lead screw 34, and a guide member 38 for guiding reciprocal movement of the carriage 36. Further, the inspection unit 30 has a laser 39 and mirrors 40 mounted on the carriage 36, and an optical head 42 which has an objective lens (not shown) mounted on the carriage 36. The optical head 42 is free to move in the direction along the rotational axis of the turntable main body 22, that is, in a vertical direction in FIG. 1.

The inspection unit 30 guides to the optical head 42 laser beams emitted from the laser 39 through a plurality of mirrors 40. The laser beams as parallel beams of a small spot are focused on the surface of the disc 21 on the turntable main body 22 by the optical head 42. At the same time, the optical head 42 converts a beam reflected by the surface of the disc 21 to an electric signal. With the disc surface defect sensing apparatus of this type, the optical head 42 is moved along the radial direction of the disc 21 and the disc 21 is driven by the turntable main body 22 in the circumferential direction at a constant speed. Thus, the surface of the disc 21 is scanned spirally with the laser beam. As a result, the reflected beam is converted to the electric signal. This electric signal is processed in order to automatically sense the surface defect in the disc 21.

Figure 2:
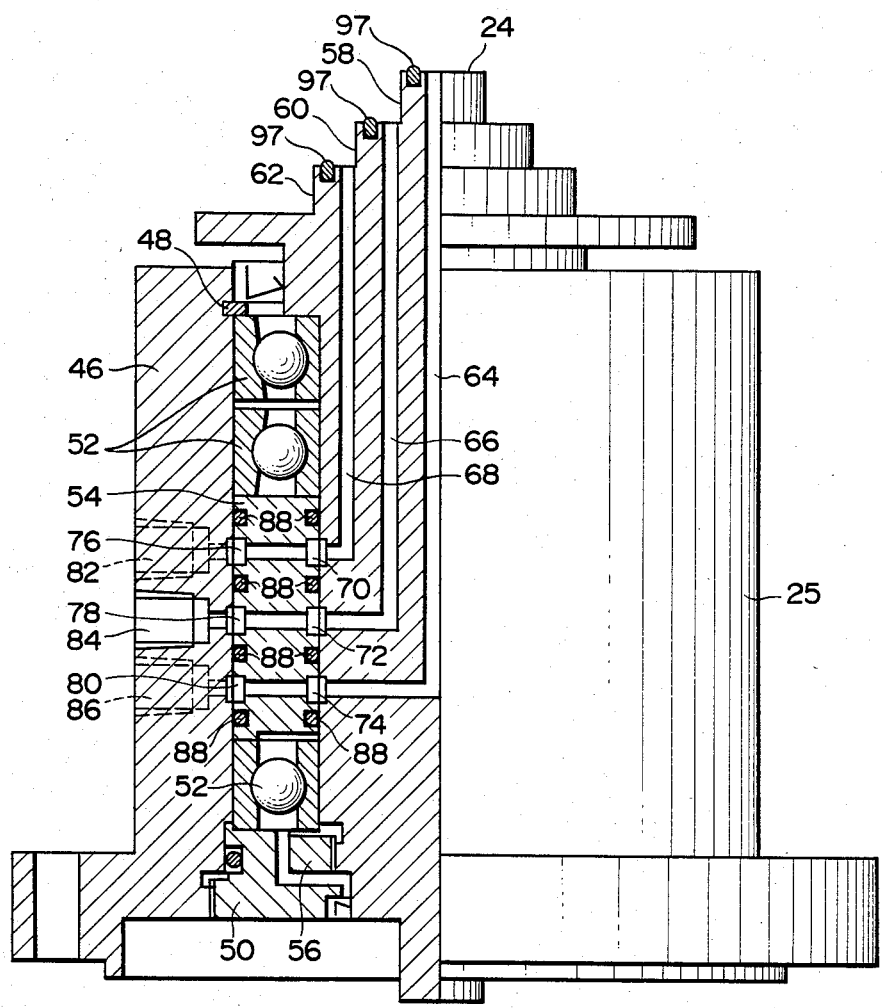
FIG. 2 is a half cutaway view showing only a turntable shaft and a turntable support of the disc drive apparatus of FIG. 1.

The structure of the turntable support 25 which rotatably supports the turntable shaft 24 of the disc drive apparatus 10 is shown in FIG. 2 in detail.

The turntable support 25 has a main body 46 the inner circumferential surface of which is of circular shape. A stop ring 48 which extends inward is disposed in the vicinity of the upper end of the inner circumferential surface. A nut 50 which extends inward is disposed in the vicinity of the inner circumferential surface. A plurality of bearings 52 and a sleeve 54 are disposed between the stop ring 48 and the nut 50. The sleeve 54 is disposed among a plurality of the bearings 52.

The turntable shaft 24 is rotatably supported by the plurality of bearings 52 and the sleeve 54 of the turntable support 25. Referring to FIG. 2, reference numeral 56 denotes a removal preventing nut disposed at the turntable shaft 24 in order to prevent removal of the inner race of the bearing 52 disposed in the lowermost stage.

First to third diameter portions 58, 60, 62 which are coaxial relative to the axis of rotation of the turntable shaft 24 and which have different diameters are disposed at the upper end of the turntable shaft 24. First to third suction channels 64, 66 and 68 are formed in the turntable shaft 24. One end each of the first to third suction channels 64 is open to one of the three end faces which cross with the first to third diameter portions 58, 60 and 62. The other end each of the first to third suction channels 64, 66 and 68 is open opposing the inner circumferential surface of the sleeve 54. The first to third suction channels 64, 66 and 68 are independent of each other.

First to third inner circumferential grooves 70, 72 and 74 extending in the circumferential direction so as to form a circle are formed opposing the other end each of the first to third suction channels 64, 66 and 68. The first to third inner circumferential grooves 70, 72 and 74 are independent of each other.

First to third outer circumferential grooves 76, 78 and 80 which are disposed in the circumferential direction and which form a circle are independently formed on the outer circumferential surface of the sleeve 54.

The first inner circumferential groove 70 and the first outer circumferential groove 76 communicate with each other through a plurality of through holes extending in the radial direction. The plurality of through holes, the first inner circumferential groove 70 and the first outer circumferential groove 76 constitute a first rotary joint.

The second inner circumferential groove 72 and the second outer circumferential groove 78 similarly communicate with each other through a plurality of through holes formed in the radial direction. The plurality of through holes, the second inner circumferential groove 72 and the outer circumferential groove 78 constitute a second rotary joint.

Further, the third inner circumferential groove 74 and the third outer circumferential groove 80 communicate with each other through a plurality of through holes formed in the radial direction. The plurality of through holes, the third inner circumferential groove 74 and the outer circumferential groove 80 constitute a third rotary joint.

The first to third outer circumferential grooves 76, 78 and 80 of the first to third rotary joints are communicate with the outer space through first to third openings 82, 84 and 86 formed in the main body 46.

The first rotary joint and the first opening 82 constitute a first suction channel of the turntable support. The second rotary joint and the second opening 84 constitute a second suction channel of the turntable support.

The third rotary joint and the third opening 86 constitute a third suction channel of the turntable support.

Seal members 88 are disposed to extend in the circumferential direction on the inner and outer circumferential surfaces of the sleeve 54 among the first to third rotary joints, above the first rotary joint and below the third rotary joint. These seal members 88 keep air tightness among the first to third rotary joints, between the first rotary joint and the outer space and between the third rotary joint and the outer space.

A plurality of annular seal members 97 are disposed at a plurality of end faces of the table shaft 24 which cross with the first to third diameter portions 58, 60 and 62.

The turntable main body 22 has first to fourth annular assembly members 90, 92, 94 and 96 of the turntable main body.

The inner circumferential surface of the fourth assembly member 96 fits with the third diameter portion 62. The fourth assembly member 96 is fixed to the table shaft 24 by known tightening means 98 such as a screw.

A recess which has an inner circumferential surface the diameter of which is substantially the same as that of the outer circumferential surface of the third assembly member 94 is formed in the upper surface of the fourth assembly member 96. The bottom surface of the recess is substantially perpendicular to the axis of rotation of the turntable shaft 24. An annular elastic member 100 is disposed about the axis of rotation of the turntable shaft 24 on the bottom surface of the recess. The elastic member 100 extends upward from the bottom surface.

The third assembly member 94 is inserted in the recess of the fourth assembly member 96. The inner circumferential surface of the third assembly member 94 fits with the second diameter portion 60. The vicinity of the inner lower circumferential surface of the third assembly member 94 abuts against the end face substantially perpendicular to the third and second diameter portions 62 and 60. The vicinity described above pushes the seal member 97 as shown in FIG. 2 so as to accomplish air tightness between the the end face and the lower surface of the third assembly member 94.

The upper surface of the third assembly member 94 is disposed on a plane substantially at the same level of the upper surface of the fourth assembly member 96. Third suction channels 102 of the turntable main body 22 are perforated in the third assembly member 94. One end of the third suction channel 102 is open to the upper surface of the third assembly member 94 and the other end thereof communicates with the upper end of the third suction channel 68 of the turntable shaft 24.

Figure 4:
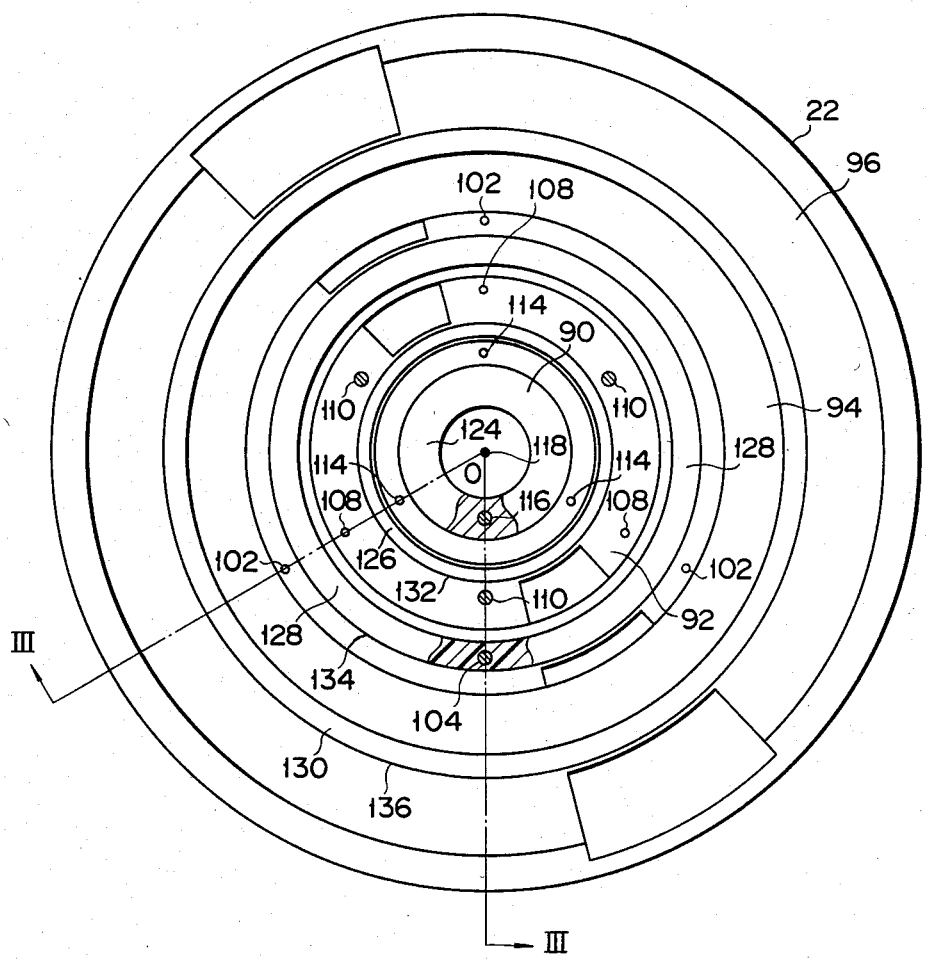
FIG. 4 is a plan view of the turntable of the disc drive apparatus of FIG. 1.

A plurality of third suction channels 102 are coaxially formed around the axis of rotation of the turntable main body 22, as shown in FIG. 4.

The third assembly member 94 is tightened to the fourth assembly member 96 by known tightening means 104 such as a bolt. The tightening means 104 is shown only in FIGS. 3 and 4. However, in practice, a plurality of tightening means 104 are aligned substantially at equal intervals on the coaxial circles around the axis of the rotation of the turntable main body 22. When the tightening force of the plurality of the tightening means 104 is changed, the upper surface of the third assembly member 94 is free to move vertically relative to the upper surface of the fourth assembly member 96 by the elastic force of the elastic member 100. And, the elastic member 100 reinforces the air tightness between the third suction channel 102 of the third assembly member 94 and the third suction channel 68 of the turntable shaft 24.

A recess having an inner circumferential surface the diameter of which is substantially the same as that of the outer circumferential surface of the second assembly member 92 is formed in the upper surface of the third assembly member 94. The bottom surface of the recess crosses substantially perpendicularly to the axis of rotation of the turntable shaft 24. An annular elastic member 106 is disposed about the axis of rotation of the turntable shaft 24 at this bottom surface. The elastic member 106 extends upward from the bottom surface.

The second assembly member 92 is inserted in the recess of the third assembly member 94. The inner circumferential surface of the second assembly member 92 fits with the first diameter portion 58 of the turntable shaft 24. The vicinity of the inner lower circumferential surface of the second assembly member 92 abuts against the end face substantially perpendicular to the second and first diameter portions 60 and 58. The seal member 97 as shown in FIG. 2 is then pushed down, thus accomplishing air tightness between the end face and the lower surface of the second assembly member 92.

The upper surface of the second assembly member 92 is disposed on a plane substantially at the same level of the upper surface of the third assembly member 94. Second suction channels 108 of the turntable main body are perforated in the second assembly member 92. One end of the second suction channel 108 is open to the upper surface of the second assembly member 92 and the other end thereof communicates with the upper end of the second suction channel 66 of the turntable shaft 24.

A plurality of second suction channels 108 is coaxially formed on circles about the axis of rotation of the turntable main body 22, as shown in FIG. 4.

Figure 3:
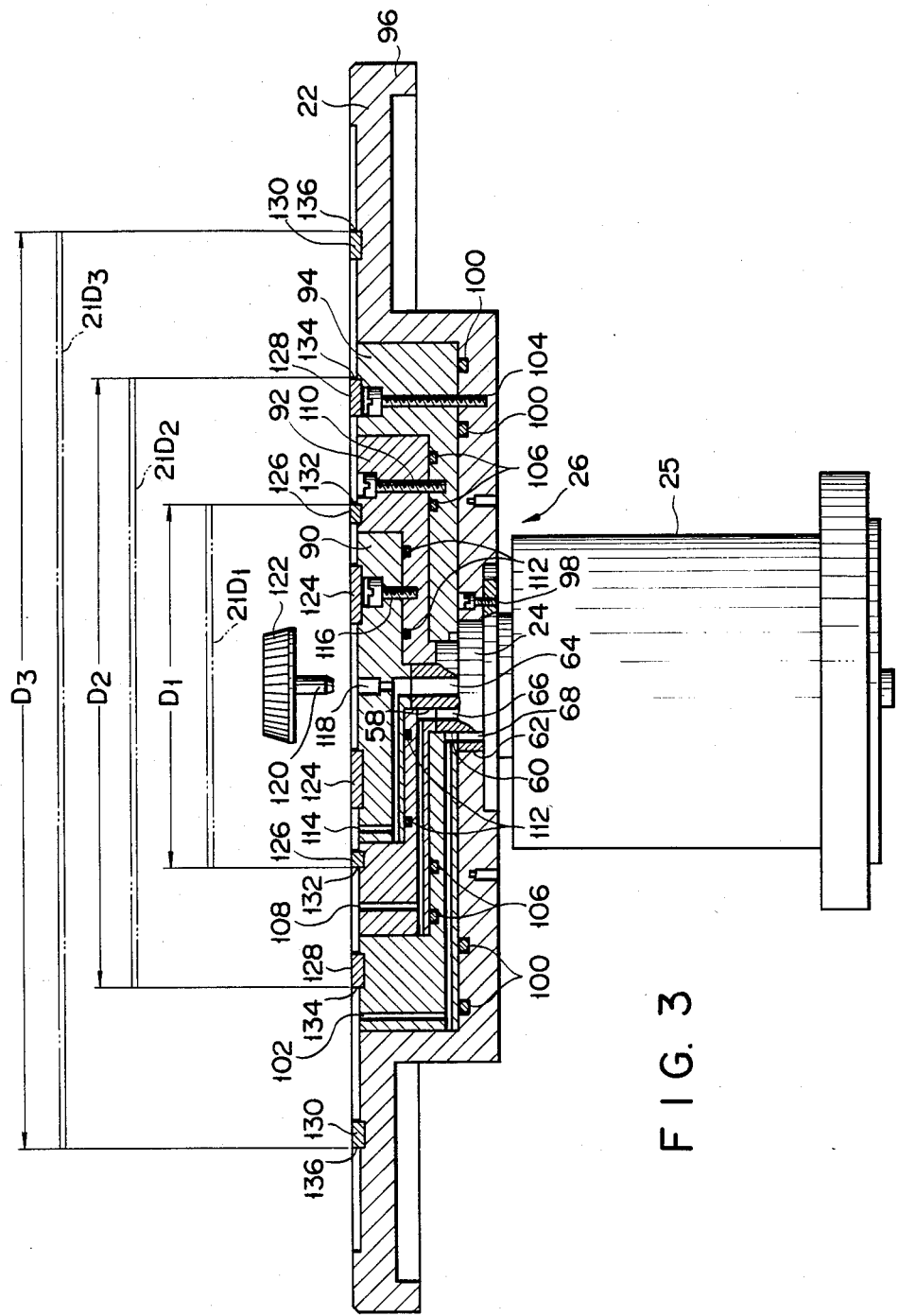
FIG. 3 is a partial sectional view of a turntable main body of the disc drive apparatus of FIG. 1 along the line III—III of FIG. 4.

The second assembly member 92 is tightened to the third assembly member 94 by known tightening means 110 such as a bolt, as shown in FIG. 3. A plurality of tightening means 110 is coaxially mounted on circles around the axis of rotation of the turntable main body 22 at substantially equal intervals. When the tightening force of these tightening means 110 is changed, the upper surface of the second assembly member 92 is free to move vertically relative to the upper surface of the third assembly member 94 by the elastic force of the elastic member 106. And, the elastic member 106 reinforces the air tightness between the second suction channel 108 of the second assembly member 92 and the second suction channel 66 of the turntable shaft 24.

A recess having an inner circumferential surface the diameter of which is substantially the same as that of the outer circumferential surface of the first assembly member 90 is formed in the upper surface of the second assembly member 92. The bottom surface of the recess crosses substantially perpendicularly to the axis of rotation of the turntable shaft 24. An elastic member 112 of annular shape is disposed about the axis of the rotation of the turntable shaft 24 on the bottom surface of the recess. The elastic member 112 extends upward from the bottom surface.

The lower surface of the first assembly member 90 of the turntable main body 22 abuts against the uppermost end face which crosses substantially perpendicular to the first diameter portion 58. This lower surface pushes down the uppermost end face as shown in FIG. 2 so as to accomplish air tightness between the uppermost end face and the lower surface of the first assembly member 90.

The upper surface of the first assembly member 90 of the turntable main body 22 is disposed on substantially the same plane as the upper surface of the second assembly member 92. First suction channels 114 of the turntable main body 22 are perforated in the first assembly member 90 of the turntable main body. One end each of the first suction channel 114 is open to the upper surface of the first assembly member 90 and the other end thereof communicates with the upper end of the first suction channel 64 of the turntable shaft 24.

A plurality of first suction channels 114 is coaxially formed about the axis of rotation of the turntable main body 22, as shown in FIG. 4.

The first assembly member 90 is tightened to the second assembly member 92 by known tightening means 116 such as a bolt, as shown in FIG. 3. FIGS. 3 and 4 show one tightening means 116. However, in practice, a plurality of tightening means 116 is coaxially disposed at substantially equal intervals around the axis of rotation of the turntable main body 22. When the tightening force of the plurality of tightening means 116 is changed, the upper surface of the first assembly member 90 is free to move vertically relative to the upper surface of the second assembly member 92 by the elastic force of the elastic member 112. And, the elastic member 112 reinforces the air tightness between the first suction channel 114 of the first assembly member 90 and the first suction channel 64 of the turntable shaft 24.

A hole 118 which acts as holding means is formed at the center of rotation of the first assembly member 90, as shown in FIG. 3.

The disc drive apparatus 10 has a centering member 122 a projection 120 of which is at the center of the lower surface and which is inserted in the hole 118, as shown in FIG. 3. The diameter of the centering member 122 may vary in accordance with various central holes of the discs.

The centering member 122 is coaxial with the axis of the center of the turntable main body 22 when the projection 120 is inserted in the hole 118. Thereafter, the centering member 122 is inserted in the central hole of the disc (not shown). This disc with a central hole is then placed coaxial about the axis of rotation of the turntable main body 22.

A first annular disc support member 124 which is coaxial with the center of rotation of the turntable main body 22 is mounted on the upper surface of the first assembly member 90, as shown in FIGS. 3 and 4.

A second annular disc support member 126 which is coaxial with the center of rotation of the turntable main body 22 is mounted on the upper surface of the second assembly member 92, as shown in FIGS. 3 and 4. The second disc support member 126 is located between the first suction channel 114 and the second suction channel 108.

A third annular disc support member 128 which is coaxial with the center of rotation of the turntable main body 22 is disposed on the upper surface of the third assembly member 94, as shown in FIGS. 3 and 4. The third disc support member 128 is located between the second suction channel 108 and the third suction channel 102.

A fourth annular disc support member 130 which is coaxial about the center of rotation of the turntable main body 22 is disposed on the upper surface of the fourth assembly member 96, as shown in FIGS. 3 and 4.

The first to fourth disc support members 124, 126, 128 and 130 respectively extend from the upper surfaces of the first to fourth assembly members 90, 92, 94 and 96, and respectively comprise an elastic material such as a felt or rubber so as not to damage the surface of the disc 21.

In the above embodiment, a diameter $D_1$ of the outer circumferential surface of the second disc support member 126 is 120 cm which is equal to the diameter of a first disc $21D_1$ without a central hole. Therefore, when the outer circumferential edge of the first disc $21D_1$ coincides the outer circumferential surface of the second disc support member 126, the first disc $21D_1$ without a central hole can be coaxial with the center of rotation of the turntable main body. This indicates that the outer circumferential surface of the second disc support member 126 serves as first centering index means 132.

In this embodiment, a diameter $D_2$ of the outer circumferential surface of the third disc support member 128 is 19.6 cm (8 inches), which is equal to the diameter of a second disc $21D_2$ without a central hole. Therefore, when the outer circumferential edge of the second disc $21D_2$ coincides the outer circumferential surface of the third disc support member 128, the second disc $21D_2$ without a central hole can be coaxial with the center of rotation of the turntable main body 22. This indicates that the outer circumferential surface of the third disc support member 128 acts as a second centering index means 134.

Further, in this embodiment, a diameter $D_3$ of the outer circumferential surface of the fourth disc support member 130 is 29.4 cm (12 inches), which is equal to that of the third disc $21D_3$ without a central hole. Therefore, when the outer circumferential edge of the fourth disc $21D_3$ coincides the outer circumferential surface of the fourth disc support member 130, the third disc $21D_3$ without a central hole can be coaxial with the center of rotation of the turntable main body 22. This also indicates that the outer circumferential surface of the fourth disc support member 130 serves as third centering index means 136.

Assume that the first disc $21D_1$ is placed on the first and second disc support members 124 and 126 and that a reduced pressure is to be imposed efficiently on the back surface of the first disc $21D_1$ by suction means to be described later, utilizing first suction channel means consisting of the first suction channel 114 of the turntable main body, the first suction channel 64 of the turntable shaft and the first suction channel of the turntable support. The upper end face of the first disc support member 124 of the first assembly member 90 and the upper end face of the second disc support member 126 of the second assembly member 92 must then be disposed on the same plane substantially perpendicular to the axis of rotation of the turntable main body 22.

Further, assume that the second disc $21D_2$ is placed on the first to third disc support members 124 to 128 and that a reduced pressure is to be imposed efficiently on the back surface of the second disc $21D_2$ by suction means to be described later, utilizing second suction channel means consisting of the second suction channel 108 of the turntable main body, the second suction channel 66 of the turntable shaft and the second suction channel of the turntable support. The upper end faces of the first to third disc support members 124 to 128 must then be disposed on the same plane substantially perpendicular to the axis of rotation of the turntable main body 22.

Further, assume that the third disc $21D_3$ is placed on the first to fourth disc support members 124 to 130 and that a reduced pressure is to be imposed efficiently on the back surface of the third disc $21D_3$ by suction means to be described later, utilizing third suction channel means consisting of the third suction channel 102 of the turntable main body, the third suction channel 68 of the turntable shaft and the third suction channel of the turntable support. The upper end faces of the first to fourth disc support members 124 to 130 must then be disposed on the same plane substantially perpendicular to the axis of rotation of the turntable main body 22.

In order to locate the upper end faces of the first to fourth disc support members 124, 126, 128 and 130 on the same plane substantially perpendicular to the center of rotation of the turntable 22, the upper end face of the first disc support member 124 of the first assembly member 90 and the upper end face of the the second disc support member 126 of the second assembly member 92 must be located on the same plane. This is accomplished by the tightening means 116 when the turntable main body 22 is assembled.

The upper end faces of the first and second disc support members 124 and 126 of the first and second assembly member 90 and 92 and the upper end face of the third disc support member 128 of the third assembly member 94 are located on the above-mentioned plane by the tightening means 110.

Further, by the tightening means 104, the upper end surfaces of the first to third disc support members 124, 126 and 128 of the first to third assembly members 90, 92 and 94 and the upper end face of the fourth disc support member 130 of the fourth assembly member 96 are located on the above-mentioned plane.

When the upper end faces of the first to fourth disc support members 124, 126, 128 and 130 are thus located on the same plane, the tightening members 116, 110 and 104 of the first to third assembly members 90, 92 and 94 are fixed with a filler.

In this embodiment, in order to achieve the above result, the second to fourth disc support members 126, 128, and 130 are adjusted by referring to the position of the upper end face of the first disc support member 124. In other words, the position along the direction of the center of rotation of the turntable main body 22 is adjusted. However, based on one of the upper end faces of the first to fourth disc support members 124 to 130, other three end faces may be adjusted vertically.

The first to third openings 82 to 86 of the first to third suction channel means of the disc drive apparatus 10 communicates with suction means 142 having a suction gauge 140 through suction channel control circuit means 138.

Figure 5:
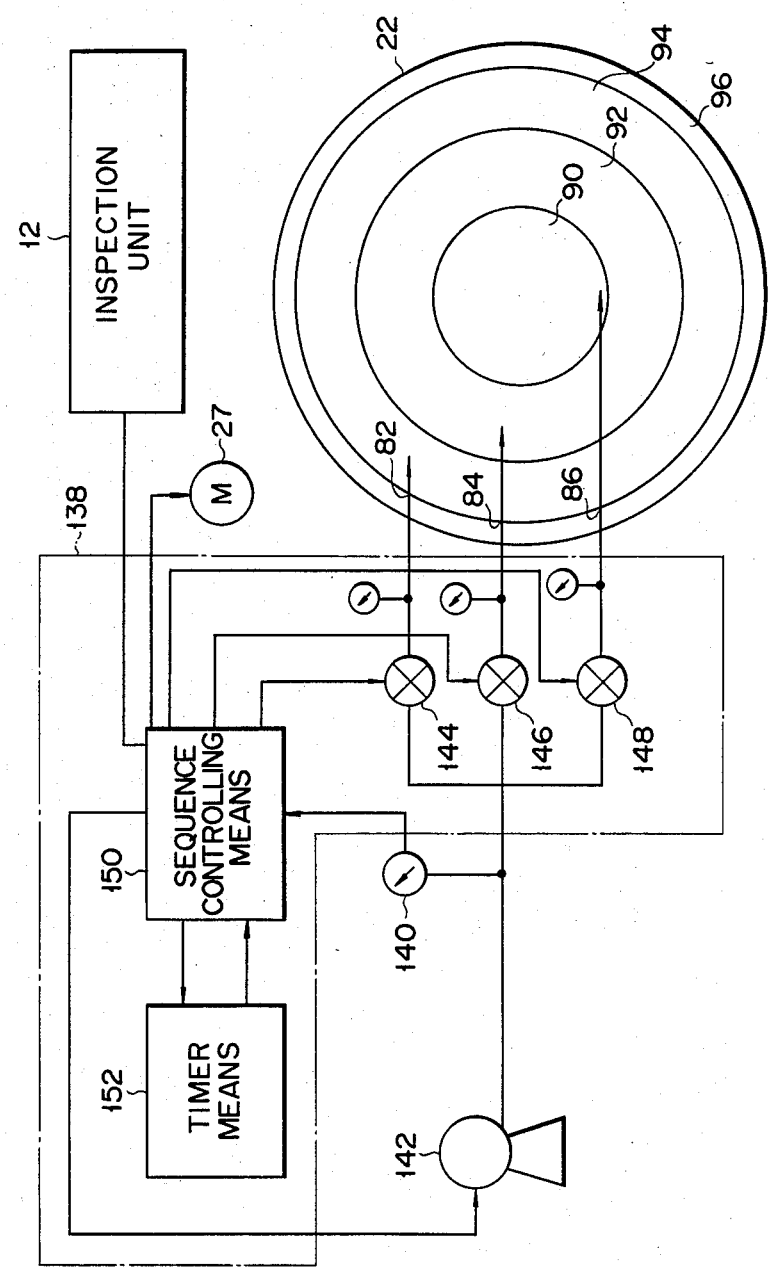
FIG. 5 is a schematic block diagram of an example of control circuit means for controlling suction and suction channel means of the disc drive apparatus of FIG. 1.

FIG. 5 schematically shows the structure of the suction channel control circuit means 138. The suction channel control circuit means 138 has first, second and third solenoid valves 144, 146 and 148 which communicate with the first to third openings 82, 84 and 86 of the first to third suction channel means.

The first to third solenoid valves 144, 146 and 148 are connected to the suction means 142. In this embodiment, the suction means 142 comprises a vacuum pump.

The channels from the first to third solenoid valves 144, 146 and 148 to the suction means 142 are also connected to the suction gauge 140. The suction channel control circuit means 138 has sequence controlling means 150 which is connected to the inspection unit 30, the driving means 27 and the first to third solenoid valves 144, 146 and 148. The sequence controlling means 150 is also connected to timer means 152.

One of the first to third discs 21D₁, 21D₂ and 21D₃ is mounted on some of the first to fourth disc support members 124, 126, 128 and 130. Thereafter, the sequence controlling means 150 supplies a signal to the first to third solenoid valves 144, 146 and 148 which are then opened. This signal is also supplied to the vacuum pump 142 which is then operated. Air is drawn into a space between the upper surfaces of the first to fourth assembly members 90, 92, 94 and 96, that is, the surface of the turntable main body 22, and one of the discs described above through the first, second and third suction channels 114, 108 and 102. One of the discs is attached to some of the upper surfaces of the first to fourth disc support members 124, 126, 128 and 130 by reduced pressure. In this condition, some of the first to fourth disc support members 124, 126, 128 and 130 serve as hermetic seals.

When the third disc 21D₃ having the largest diameter is used, predetermined reduced pressure is detected by the suction gauge 140 after a predetermined period of time elapses. A detection signal is supplied to the sequence controlling means 150. The sequence controlling means 150 receives the signal from the suction gauge 140 and controls the driving means 27 which drives the turntable 26. Further, the inspection unit 30 is driven from the center of the third disc 21D₃ to the circumferential edge in the radial direction. The operation of the suction means 142 is interrupted and the first to third solenoid valves 144, 146 and 148 are closed. Therefore, the reduced pressure of the first, second and third suction channels 114, 108 and 102 is maintained, while the inspection unit 30 is being operated. Thus, the third disc 21D₃ is brought into tight contact with the surface of the turntable 26, and they are integrally driven.

When the second disc 21D₂ which has an intermediate diameter is used, air is continuously drawn from the third suction channel 102. Even if the predetermined period of time which is set by the timer means 152 elapses, the predetermined reduced pressure may not be measured by the suction gauge 140. Therefore, the suction gauge 140 does not supply a signal to the sequence controlling means 150. If this occurs, the sequence controlling means 150 controls to close the first solenoid valve 144. Then, the reduced pressure is imposed only on the second and first suction channels 108 and 114. The second disc 21D₂ is thus brought into tight contact with the upper surface of the first to third disc support members 124 to 128. The sequence controlling means 150 controls to move the inspection unit 30 from the center of the second disc 21D₂ to its periphery in the radial direction.

However, when the first disc 21D₁ is used, air is continuously drawn from the third and second suction channels 102 and 108. Even if the predetermined period of time which is set by the timer means 152 elapses, the predetermined reduced pressure is not measured by the suction gauge 140. Thus, the suction gauge 140 does not supply a signal to the sequence controlling means 150. If this occurs, the sequence controlling means 150 controls to close the first solenoid valve 144 corresponding to the third suction channel 102.

However, since air is still drawn from the second suction channel 108, the suction gauge 140 does not measure the predetermined reduced pressure even if the predetermined period of time set by the timer means 152 elapses. Thus, the suction gauge 140 does not supply a signal to the sequence controlling means 150. The sequence controlling means 150 then controls to close the second solenoid valve 146 corresponding to the second suction channel 108. The reduced pressure is imposed on the first suction channel 114. Therefore, the first disc 21D₁ is brought into tight contact with the upper surfaces of the first and second disc support members 124 and 126. The sequence controlling means 150 controls to move the inspection unit 30 from the center of the first disc 21D₁ to its periphery in the radial direction.

As described above, the disc 21 is selected from the various discs of different diameters with or without a central hole and is coaxially placed on the turntable 26 and firmly held by the reduced pressure. Therefore, the disc 21 may not be misaligned with the center of rotation erroneously upon rotation of the turntable 26 when the inspection unit 30 detects damage on the surface of the disc 21.

Further, the disc 21 which is held on the turntable 26 is not directly in contact with its surface. Instead, the disc 21 is brought into contact with some of the upper surfaces of the first to fourth disc support members 124 to 130 of the elastic material, thus preventing damage to the disc 21.

Further, according to the structure of the turntable support 25 of the above embodiment, it is made rigid enough to support the turntable 26 which weighs heavier since the plurality of assembly members constitute the turntable 26. However, deviation of the disc 21 upon rotation of the turntable 26 is minimized. In addition to this, the centering member 122 or the first to third centering index means 132, 134 and 136 are used to dispose, coaxially with the turntable 26, the disc 21 selected from the various discs of different diameters with or without a central hole. Thus, spiral scanning tracing may not be repeated.

Further, joints or pipe members are not used in forming the first, second and third suction channels 114, 108 and 102 of the turntable body 22 and the first to third suction channels 64, 66 and 68 of the turntable shaft 24. Thus, the structure and assembly of the turntable main body 22 and the suction channel means inside the turntable shaft 24 are simplified. With the above structure, vacuum leakage due to the force applied when the turntable stops rotation can be prevented even though this occurs as with the pipe members.

The outer circumferential surface of the first assembly member 90 and the inner circumferential surface of the second assembly member 92 are disposed between the first and second disc support members 124 and 126. The outer circumferential surface of the second assembly member 92 and the inner circumferential surface of the third assembly member 94 are disposed between the second and third disc support members 126 and 128. Similarly, the outer circumferential surface of the third assembly member 94 and the inner circumferential surface of the fourth assembly member 96 are disposed between the third and fourth disc support members 128 and 130. Therefore, even if a relatively large gap is formed between the opposing outer and inner circumferential surfaces, the reduced pressure, generated by the first, second and third suction channels 114, 108 and 102 for bringing the disc 21 into contact with the first to fourth disc support members 124, 126, 128 and 130 may not be decreased.

In the above embodiment, the inner and outer circumferential surfaces of the first to fourth assembly members 90 to 96 and the lower surface of the upper end of the turntable shaft 24 constitute stepped portions in combination with the first to third diameter portions 58, 60 and 62. Further, the plurality of seal members 97 are disposed on the turntable shaft 24 whose the plurality of end faces intersect the plurality of diameter portions. Therefore, air tightness between the first, second and third suction channels 114, 108 and 102 of the turntable main body 22 and the first, second and third suction channels 64, 66 and 68 of the turntable shaft 24, respectively, is further improved.

With the stepped structure, the first to fourth assembly members 90 to 96 are easily aligned with the turntable shaft 24. From the top of the turntable main body 22, the first to fourth assembly members 90 to 96 are easily assembled and these assembly members are also easily assembled on the turntable shaft 24. The turntable main body 22 is then assembled on the turntable shaft 24 easily.

According to the present invention, a disc drive apparatus for driving a disc selected from discs of various diameters with and without a central hole comprises: a turntable; a turntable support for rotatably supporting said turntable; driving means for driving said turntable; a centering member for mounting a disc with a central hole; holding means, disposed at the center of rotation of said turntable, for detachably holding said centering member; a plurality of elastic disc support members which are coaxial with the center of rotation of said turntable, which extend from the surface of said turntable, and which form a plurality of annular shapes; centering index means, disposed on said turntable, for centering a disc without a central hole; suction means; and suction channel means, one end of which is open to the surface of said turntable and the other end of which is connected to said suction means, for fixing on some of said disc support members the disc selected from discs of various diameters with and without a central hole and placed on some of said disc support members.

With the above structure, various discs can be properly aligned with the turntable regardless of the size of the diameter of the central hole and the presence or absence of the central hole. Further, the surface of the disc may not be damaged.

According to the disc drive apparatus of the present invention, the centering index means preferably has a plurality of projections which extend from the surface of the turntable and are coaxial with the center of rotation.

With the above structure, when the outer circumferential edge of the disc is aligned with the outer circumferential surface of the projection as the centering index means, the disc without a central hole can be coaxial with the turntable 26 extremely easily.

According to the disc drive apparatus of the present invention, the projection of the centering index means preferably comprises the disc support members, the outer circumferential surfaces of which are the centering index means.

With this structure, a disc without a central hole can be easily arranged coaxial with the turntable 26. Further, the structure of the centering index means can be simplified.

In the disc drive apparatus according to the present invention, the holding means preferably comprises a hole in which the centering member is detachably inserted.

With the above structure, the holding means can be simplified and its manufacturing process can also be simplified.

In the disc drive apparatus according to the present invention, the turntable preferably has a recess which extends from the inside of the circumferential edge of the back surface of the disc selected from various discs and placed on the plurality of disc support members and which further extends to the outside of the circumferential edge.

With the above structure, even if the reduced pressure which brings the disc into contact with the disc support members is very high, fingers may be inserted between the turntable and the disc. Therefore, the disc can be easily separated from the disc support members. In other words, the disc can be easily lifted from the turntable 26.

As is apparent from the above description, when a plurality of discs 21 may be mounted on the turntable, the number of the disc support members is determined to be (n+1) where n is defined as the number of the component members of the main body.

In the disc drive apparatus according to the present invention, the turntable comprises a turntable main body having a turntable surface, and a turntable shaft which is disposed at the center of rotation of the turntable main body, which is rotatably supported by the turntable support and which is connected to the driving means. The turntable main body preferably has a plurality of annular assembly members which are coaxial with each other. The suction channel means preferably has a suction channel portion of the turntable main body which has one end described above, a suction channel portion of the turntable shaft, and a suction channel portion of the turntable support which has the other end as described above.

With the above structure, pipe members such as pipes and joints need not be used. The suction channel means in the turntable main body and the turntable can be simplified. Further, reduced pressure leakage is prevented when the turntable rotates and stops rotation.

Further in the disc drive apparatus according to the present invention, a plurality of different diameter portions are coaxially formed on one end of the turntable shaft. The plurality of assembly members of the turntable main body have inner circumferential surfaces which are fitted in one of the plurality of the different diameter portions. The suction channel portion of the turntable shaft of the suction channel means preferably has one end which communicates with the suction channel portion of the table main body and which is open to an end face intersecting with one of the plurality of different diameter portions of the turntable shaft, and the other end which communicates with the suction channel portion of the turntable support.

With the above structure, the connecting means for connecting the suction channel of the turntable main body and the suction channel of the turntable shaft can be simplified. Further, the reduced pressure may not leak from the connecting means due to the force generated upon rotation and interruption of rotation of the turntable.

In the disc drive apparatus according to the present invention, the other end of the suction channel of the turntable shaft of the suction channel means and the suction channel of the turntable support preferably communicate by a rotary joint.

With the above structure, communication between these channels is established regardless of rotation of the turntable shaft. Further, the connecting means between these channels can be simplified.

Further, in the disc drive apparatus, one end of the suction channel of the turntable main body of the suction channel means comprises one inner circumferential surface and one outer circumferential surface each of adjacent assembly members of the turntable main body.

With the above structure, the suction channel of the turntable main body of the suction channel means can be simplified and the manufacturing process thereof can also be simplified.

The present invention is not limited to the above particular embodiment. Various changes and modifications may be provided within the spirit and scope of the present invention.

Figure 6:
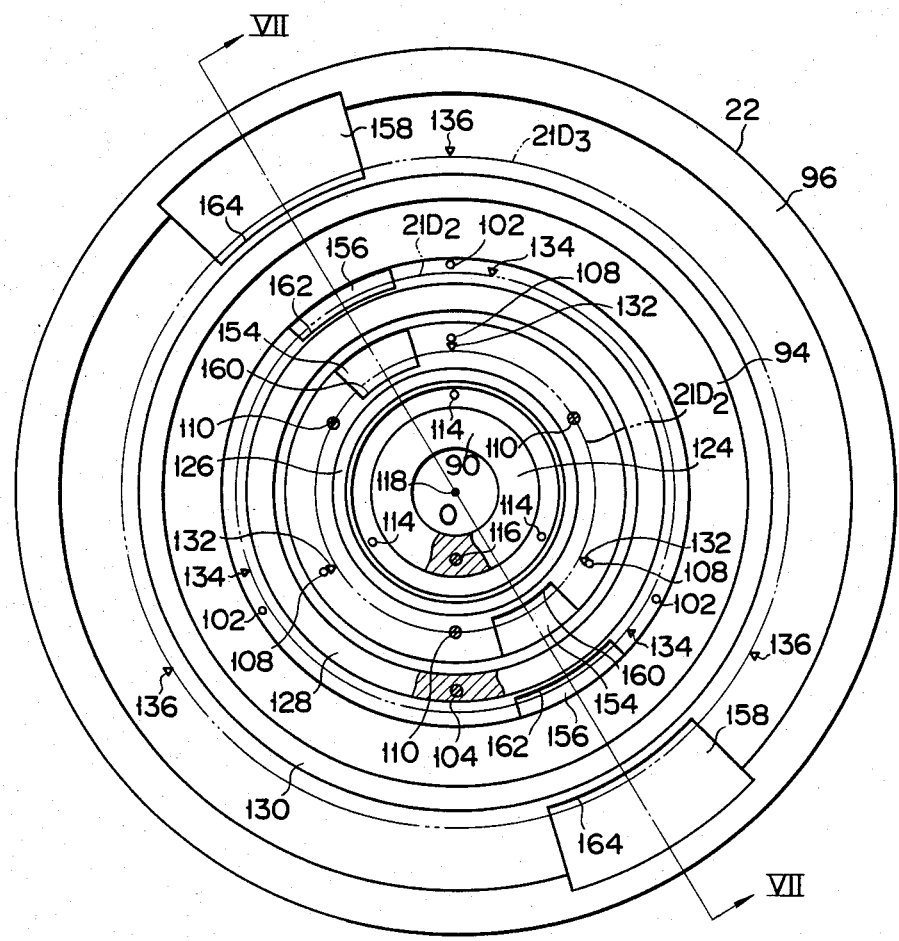
FIG. 6 is a plan view of a modification of the turntable main body.
Figure 7:
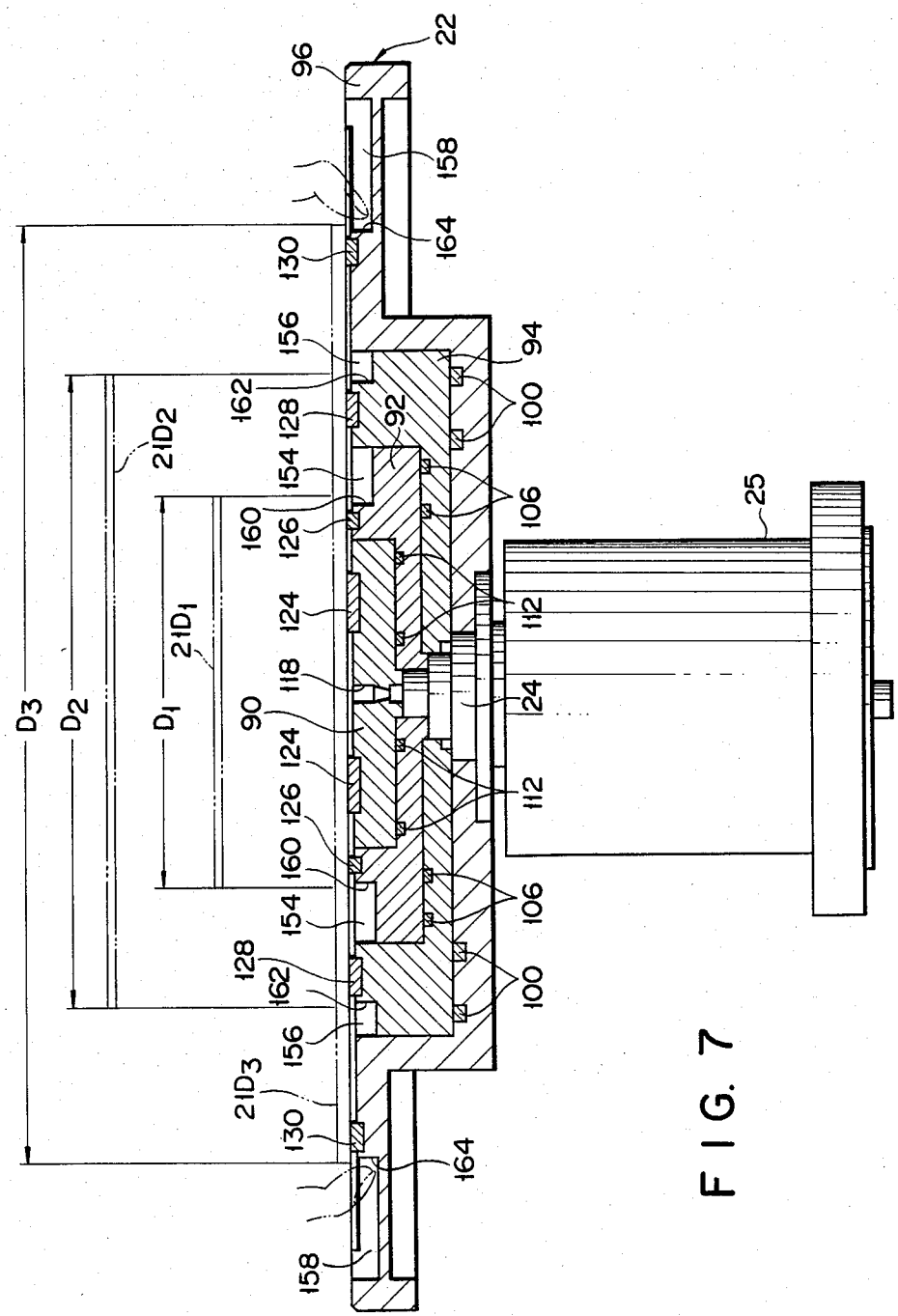
FIG. 7 is a partial sectional view of the modification of the turntable main body along the line VII—VII of FIG. 6.

As shown in FIGS. 6 and 7, for example, the diameter of the outer circumferential surface of the fourth disc support member 130 may be slightly smaller than the diameter $D_3$ of the third disc $21D_3$ which is placed on the fourth support member 130. The diameter of the outer circumferential surface of the third disc support member 128 may be slightly smaller than the diameter $D_2$ of the second disc $21D_2$ which is placed on the third disc support member 128. Similarly, the diameter of the outer circumferential surface of the second disc support member 126 may be slightly smaller than the diameter $D_1$ of the first disc $21D_1$ which is placed on the second disc support member 126.

In order to coaxially align the first to third discs $21D_1$ to $21D_3$ without central holes with the center of rotation of the turntable main body 22, the first to third centering index means 132 to 136 are marked by known means such as printing, forming or punching on a plurality of imaginary circles which are formed on the surface of the turntable main body 22 as shown in FIG. 6, that is, on the upper surfaces of the first to fourth assembly members 90 to 96. These imaginary circles are coaxial with the center of rotation of the turntable main body 22 and have the same diameters $D_1$, $D_2$ and $D_3$ as the outer circumferences of the first to third discs $21D_1$ to $21D_3$.

Further, as shown in FIGS. 6 and 7, first to third recesses 154 to 158 are formed in the upper surfaces of the second to fourth assembly members 92 to 96. An inner circumferential surface 160 of the first recess 154 is located inside the outer circumferential edge of the first disc $21D_1$ which is coaxially placed on the second disc support member 126 in the radial direction of the first disc $21D_1$. An inner circumferential surface 162 of the second recess 156 is located inside the outer circumferential edge of the second disc $21D_2$ which is coaxially placed on the third disc support member 128. Similarly, an inner circumferential surface 164 of the third recess 158 is located inside the outer circumferential edge of the third disc $21D_3$ which is coaxially placed on the fourth disc support member 130 in the radial direction of the third disc $21D_3$.

With the above structure, one of the first to third discs $21D_1$ to $21D_3$ is placed on some of the second to fourth disc support members 126 to 130. Even if the reduced pressure is very high, as shown in FIG. 7, the fingers can be inserted in the third recess 158 and can hook a disc at its outer circumferential edge. As a result, one of the first to third discs $21D_1$ to $21D_3$ can be easily lifted from some of the second to fourth disc support members 126, 128 and 130, that is, from the surface of the turntable 26.

Figure 8:
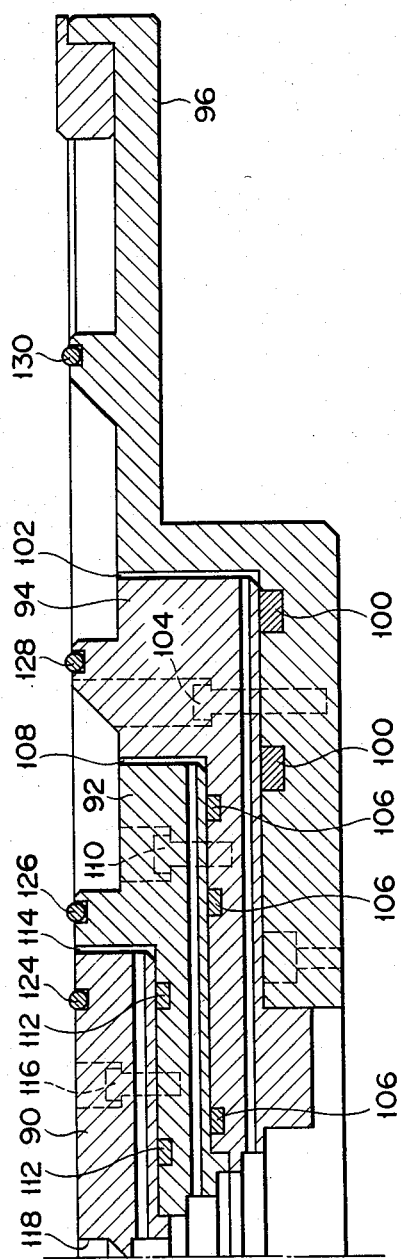
FIG. 8 is a sectional view showing another modification of the turntable main body and first to fourth modifications of a disc support member in the same manner as in FIG. 7.

Further, as shown in FIG. 8, the cross section of the first to fourth disc support members 124, 126, 128 and 130 may be of circular shape. Referring to the same figure, one end of the first suction channel 114 may be constituted by a gap between the outer circumferential surface of the first assembly member 90 and the inner circumferential surface of the second assembly member 92. One end of the second suction channel 108 may be constituted by a gap between the outer circumferential surface of the second assembly member 92 and the inner circumferential surface of the third assembly member 94. Similarly, one end of the third suction channel 102 may be constituted by a gap between the outer circumferential surface of the third assembly member 94 and the inner circumferential surface of the fourth assembly member 96.

The turntable main body 22 may be constituted by only the first to third assembly members 90 to 94. Alternatively, the turntable main body 22 may be constituted by only the first and second assembly members 90 and 92. However, in the former case, the third suction channel 102 of the turntable main body, the third suction channel of the turntable shaft, and the third suction channel of the turntable support are omitted from the third assembly member 94, the turntable shaft 24 and the turntable support 25. In the latter case, the second suction channel 108 of the turntable main body, the second suction channel of the turntable shaft, and the second suction channel of the turntable support are omitted from the second table assembly member 92, the turntable shaft 24 and the turntable support 25.

What we claim is:

1. In a disc inspection apparatus, a disc drive for driving a disc selected from discs of various diameters with and without a central hole, the disc drive for disc inspection comprising:
   a turntable;
   a turntable support for rotatably supporting said turntable;
   driving means for driving said turntable;
   a centering member for mounting a disc with a central hole;
   holding means, disposed at the center of rotation of said turntable, for detachably holding said centering member;
   a plurality of elastic disc support members which are coaxial with the center of rotation of said turntable, which extent from the surface of said turntable, and which form a plurality of annular shapes;
   centering index means, disposed on said turntable, for centering a disc without a central hole;
   suction means; and
   suction channel means, one end of which is open to the surface of said turntable and the other end of which is connected to said suction means, for fixing on at least one of said disc support members, a disc selected from discs of various diameters with or without a central hole and placed on said at least one disc support member.

2. The disc drive for a disc inspection apparatus according to claim 1, wherein said centering index means includes plurality of projections which extend from the surface of said turntable and are coaxial with the center of rotation thereof.

3. The disc drive for a disc inspection apparatus according to claim 1, wherein said holding means comprises a hole in which said centering member is detachably inserted.

4. The disc drive for a disc inspection apparatus according to claim 3, wherein said centering index means includes a plurality of projections which extend from the surface of said turntable and are coaxial with the center of rotation thereof.

5. The disc drive for a disc inspection apparatus according to claim 4, wherein said projections of said centering index means comprise said disc support members, the outer circumferential surfaces of which comprise said centering index means.

6. The disc drive for a disc inspection apparatus according to claim 3, wherein said turntable has a recess which extends from the inside of the circumferential edge of the back surface of the disc selected from various discs and placed on said plurality of disc support members and which further extends to the outside of said circumferential edge.

7. The disc drive for a disc inspection apparatus according to claim 2, wherein said projections of said centering index means comprises said disc support members, the outer circumferential surfaces of which comprise said centering index means.

8. The disc drive for a disc inspection apparatus according to claim 1, wherein said turntable has a recess which extends from the inside of the circumferential edge of the back surface of the disc selected from various discs and placed on said plurality of disc support members and which further extends to the outside of said circumferential edge.

9. The disc drive for a disc inspection apparatus according to any one of claims 1, 2, 7, 3, 8, 4, 5 or 6, wherein said turntable comprises a turntable main body having a turntable surface, and a turntable shaft which is disposed at the center of rotation of said turntable main body, which is rotatably supported by said turntable support and which is connected to said driving means; said turntable main body has a plurality of annular assembly members which are coaxial with each other; and said suction channel means has a suction channel portion of said turntable main body which has said one end, a suction channel portion of said turntable shaft, and a suction channel portion of said turntable support which has said other end.

10. The disc drive for a disc inspection apparatus according to claim 9, wherein a plurality of different diameter portions are coaxially formed on one end of said turntable shaft; said plurality of assembly members of said turntable main body have inner circumferential surfaces which fit with one of said plurality of different diameter portions; and said suction channel portion of said turntable shaft of said suction channel means has one end which communicates with said suction channel portion of said table main body and which is open to an end face intersecting with one of said plurality of different diameter portions of said turntable shaft, and the other end which communicates with said suction channel portion of said turntable support.

11. The disc drive for a disc inspection apparatus according to claim 10, wherein said other end of said suction channel of said turntable shaft of said suction channel means and said suction channel of said turntable support communicate with each other through a rotary joint.

12. The disc drive for a disc inspection apparatus according to claim 10, wherein said one end of said suction channel of said turntable main body of said suction channel means comprises one inner circumferential surface and one outer circumferential surface each of adjacent assembly members of said turntable main body.

13. The disc drive for a disc inspection apparatus according to claim 12, wherein said other end of said suction channel of said turntable shaft of said suction channel means and said suction channel of said turntable support communicate with each other through a rotary joint.

* * * * *